United States Patent [19]
Bruce et al.

[11] 3,734,125
[45] May 22, 1973

[54] PRESSURIZED CONTAINER DISPENSING VALVE HAVING EXCESSIVE PRESSURE SAFETY FEATURE

[75] Inventors: Roger K. Bruce, Mission Viejo; Werner Marhold, Huntington Beach; Cecil F. Adickes, Playa Del Rey, all of Calif.

[73] Assignee: Sterigard Corporation, Santa Ana, Calif.

[22] Filed: Feb. 10, 1971

[21] Appl. No.: 114,204

[52] U.S. Cl. ..................137/495, 251/14, 251/144, 251/245, 251/322, 239/569, 222/509
[51] Int. Cl. ............................................F16k 31/14
[58] Field of Search.........................251/12, 14, 144, 251/155, 240, 245, 322, 184; 137/495, 509, 614.19; 222/394, 396, 509; 239/573, 569

[56] References Cited

UNITED STATES PATENTS

| 3,459,345 | 8/1969 | Chernak et al. | 251/331 |
|---|---|---|---|
| 3,584,789 | 6/1971 | Traynor | 239/573 X |
| 2,592,056 | 4/1952 | Mueller | 251/184 X |
| 2,911,159 | 11/1959 | Doyle | 251/245 X |
| 2,928,576 | 3/1960 | Kochner | 222/394 |

*Primary Examiner*—William R. Cline
*Attorney*—Christie, Parker & Hale

[57] ABSTRACT

A one-piece molded plastic housing of a dispensing valve has a barrel for the valve's valving mechanism. The base is adapted to be pressure tightly attached to a dispenser. In order to maximize the number of valve housings produced in a given mold base, a base parting plane extends along the base's longitudinal axis slightly into the barrel. A transition parting plane extends from the terminus of the base parting plane at a slight angle from a normal to the base parting plane to meet a barrel parting plane close to the rear end of the barrel. An annular external flange extends partly around the barrel and meets the barrel parting plane and terminates at the transition plane. With this parting plane pattern, a core pin for the barrel's bore can be carried by a mold half, thereby eliminating complicated and space consuming core pin ejection mechanisms. The valving mechanism includes a plug disposed in the barrel's bore for translation between a closed position and an open position. In the closed position, the plug seats on an interior seat of the barrel. This seat defines a line seal. The plug has a cupped seal with an annular flexible lip in engagement with a wall of the barrel's bore. A valve stem is attached to the plug by lock rings on the stem received in complementary recesses in an axial bore of the plug. The valve stem extends rearwardly through the barrel and past its end. A rear cap is attached to the barrel over the external flange and closes the rear end of the barrel's bore. An actuator is engaged to the stem and has a bearing point on the rear cap for pivotal movement to open the valve. The valve stem and plug are biased into their closed position by a spring bearing against the rear cap and the cup seal.

24 Claims, 7 Drawing Figures

PATENTED MAY 22 1973
3,734,125
SHEET 1 OF 2
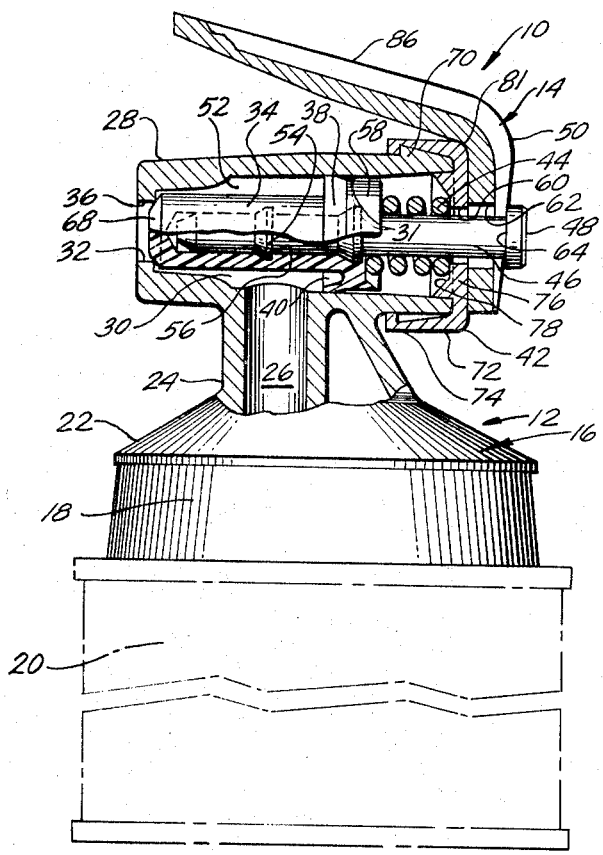
FIG.1
FIG.2
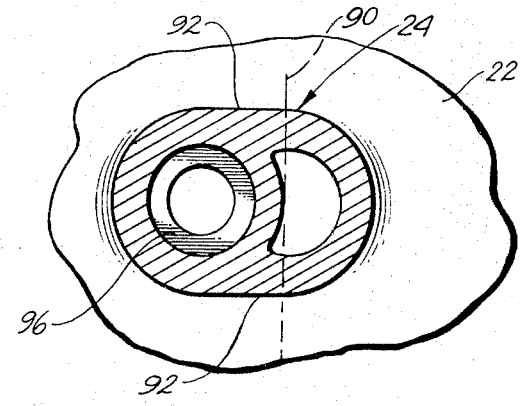
FIG.4
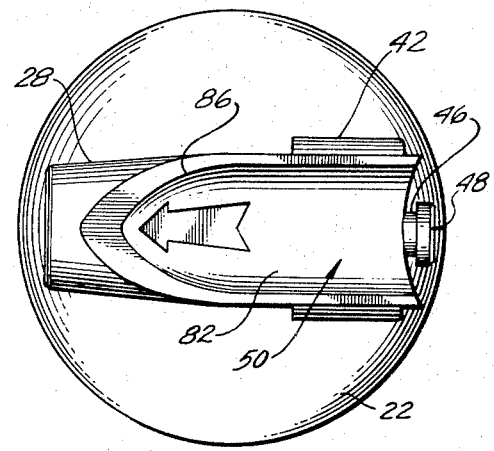
FIG.5
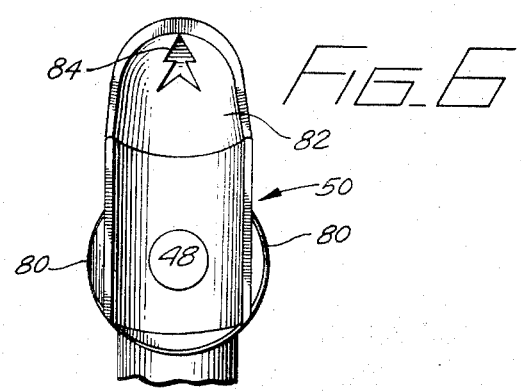
FIG.6
INVENTORS.
ROGER K. BRUCE
WERNER MARHOLD
CECIL F. ADICKES
BY
Christie Parker & Hale
ATTORNEYS

PRESSURIZED CONTAINER DISPENSING VALVE HAVING EXCESSIVE PRESSURE SAFETY FEATURE

BACKGROUND OF THE INVENTION

The present invention relates in general to dispensing valves for dispensers of the type which maintain a product to be dispensed under pressure. More particularly, the present invention relates to a dispensing valve which combines a tip sealing function, safely venting function, and extremely low production costs.

Fluid dispensers which maintain a product to be dispensed under pressure have been available for some time and are becoming increasingly popular. This type of dispenser employs a hand-actuated dispensing valve for dispensing product. Costs of a dispenser and its dispenser valve must be maintained as low as possible, for the consumers who are attracted by the convenience of pressurized dispensers cannot be expected to pay an inordinate amount for the convenience.

Most, if not all, presently available pressurized dispensers are hazardous in that when they are exposed to relatively high temperatures they explode catastrophically. A reason for this is in dispensing valve design. Because the pressurized dispensers must maintain a product to be dispensed under pressure, valves are designed so that product pressure urges the valves closed. With increasing product pressure, the force of closure increases. A recent development in the area of dispenser valve design gives great promise for alleviating the explosion hazard. Notably, U.S. Pat. No. 3,519,172 to John K. Bruce describes a dispensing valve which opens above a predetermined pressure within its associated dispenser. The Bruce valve works by internal container pressure acting on the stem of the dispenser valve in opposition to spring pressure.

Other approaches to the explosive problem outside of valve design have been proposed. Apparently the reason that these approaches, to be discussed briefly below, have been proposed, is the reluctance of major dispensing valve producers to abandon valve design which tends to reduce closure force with dispenser pressures. One of the concepts envisions a plug of a low melting point material which will melt and vent the interior of dispenser when subject to high temperatures. This concept is deficient in that it is difficult to assure the high degree of reliability in the plug necessary to prevent venting or leakage below the plug's melting point. In addition, a low melting point plug is not pressure sensitive but only temperature sensitive, and, as such, it does not perform its venting function in all possible hazardous situations. Dispensers and their domes have been the subject of surface scoring designs which effect venting by dispenser separation or the creation of holes under the influence of pressure alone. Scoring concepts are not reliable because material thickness tolerances do not admit to accurately scored thickness control. Moreover, dispenser separation creates at least two potential missiles, the separated halves of the dispenser.

Another problem with most prior art dispensing valves which is particularly acute is that the valving element of these dispensing valves seals well within a product passage. This means that there is a considerable length of product passage between the valving element and the outside of a valve in which product remains after the valve has been actuated. This trapped product produces product dripping, clogging of the passage and even product spoilage in the passage.

Other serious drawbacks in presently available dispenser valves include limited orificing which makes dispensing of such viscous products as cheese and honey difficult or impossible, and the fact that the valves have a substantial proportion of rubber and metal components which generate serious compatibility problems with acid, alkali and oil-based products.

SUMMARY OF THE INVENTION

The present invention provides a dispensing valve which is extremely economical to produce because its geometry admits to highly efficient mold design and utilization. In addition, the dispensing valve vents the interior of a dispenser when a predetermined pressure within a dispenser is reached and, what is more, the valve eliminates the long, exposed product passages of prior art pressure dispensing valves which are susceptible to clogging, product spoilage and dripping.

A specific form of the dispenser valve of the present invention has a housing constituted of a base and a barrel. The base is adapted to be mounted on a pressurized dispenser as over the lip of a dome of such a dispenser. The barrel, having a bore extending along its longitudinal axis, is disposed at right angles to the base. A valving element, in the form of a plug in the barrel's bore, seats on an interior seat at a nozzle end of the barrel. The nozzle end of the barrel has a nozzle of short axial length which opens into the product chamber and to atmosphere. The nozzle opening is smaller than the bore of the barrel. An actuator is coupled to the valving element to open the valve. A portion of the barrel's bore is a product chamber which is bounded by a pressure responsive element coupled to the valving element and which sees product pressure in the product chamber. Means such as a compression spring is disposed in the barrel's bore between this element and a rear closure cap mounted at the rear end of the barrel. The pressure responsive element has an area against which product pressure can act which is sufficient to overcome the closing force of the biasing means at some predetermined excessive pressure and vent the interior of the dispenser.

One of the salient features of the present invention is in the valve's housing configuration. Low production costs are mandatory in dispensing valves for pressurized dispensers because the total cost of the dispenser including the valve must be very low with respect to the value of the product. The valve housing of the present invention has its barrel at right angles to the base. A reason for this orientation is that it is preferred by consumers. But the right angle orientation is also necessary to accommodate valve closure at the nozzle in a valve having a safety venting function without cumbersome actuator design. It has also been found that assembly of the valving mechanism and its attendant elements, such as the rear cap, from one end of the barrel's bore is considerably more economical than assembly from both ends of the bore.

The base itself outside of its product passage is hollow to reduce the amount of plastic used in a given housing, to reduce cooling time in the mold, and to eliminate dimensional variances associated with large masses of molded plastic. Because the base has a product passage and is essentially hollow anyway, and because of the requirement for a bore in the barrel, a mold must have at least two cores oriented at right angles to each other, one for the barrel's bore, and one for the hollow base. These cores must be withdrawn from a molded housing to free the housing after it has been molded. It has been found that two cores having their axes lying in the parting plane of a mold results in a very complicated mold design because mold separation itself does not withdraw the cores. As such, additional means must be provided to withdraw both cores from the molded housing. These means in a multi-cavity mold necessarily reduce the number of cavities that the mold base can have.

It has also been found that the requisite undercut required to effect a flange and groove mounting of the rear closure cap in the barrel's bore is too great for a simple core, for material will be torn from the wall of the bore during core withdrawal. Moreover, an interior flange and groove reduces the volume within the bore for the closure spring. As a consequence, it is necessary to have an external mounting flange for the rear closure cap. With an external mounting flange it is necessary to avoid an undercut, for it is not possible to pull the part from the mold with the size flange necessary to hold the closure cap because of the amount of material which would have to be compressed.

The resultant housing geometry required to satisfy these and other dictates of the valve is relatively complex. Nonetheless, it has been found that a very simple and efficient mold is possible to satisfy the requirements of the housing design if the housing has a certain configuration. This mold design employs staggered parting planes connected by a transition parting plane. Specifically, a base parting plane containing the longitudinal axis of the base extends through the base and slightly into the barrel. A barrel parting plane extends from the interior shoulder of the closure cap's mounting flange normal to the axis of the barrel and offset from the base's parting plane to a terminus which, in elevation, is slightly above the terminus of the base's parting plane. The barrel's parting plane lying on the interior boundary of the mounting flange avoids an external undercut in a mold. The transition plane connects to the base and the barrel parting planes. This mold design allows the barrel's core to be carried by one of the mold halves with the result that for a given size mold base a considerable number of cavities can be employed.

To facilitate mold stripping and accommodate the staggered parting planes, the barrel has a longitudinal taper on its outside which extends to the base's parting plane. The exterior surface of the barrel then continues rearwardly as a right cylindrical surface to the exterior flange used for mounting the rear closure cap. The mounting flange extends around the barrel normal to the barrel's axis but does not extend completely around the barrel. The barrel's parting plane meets the inner end of this exterior flange. The transition parting plane extends from the base of the flange, that is, where it terminates, to the base's parting plane through the right cylindrical surface of the barrel. This provides a barrel geometry with no undercuts which would prevent mold release or require unacceptable mold strippers.

It is preferred that the plug of the valving element be formed of a relatively flexible material such as low density polyethylene and that it be formed integrally with the pressure responsive element which closes the rear of the product chamber. The pressure responsive element is a cup having an annular lip in engagement with the wall of the product chamber for product pressure to act against and effect a seal. The actuator is preferably in the shape of a "lazy" L with one leg extending over the top of the barrel and a shorter leg extending downwardly for engagement by a head of a valve stem of the valving element. The junction between the two legs of the actuator bears against the rear closure cap such that when the free leg of the actuator is depressed the captured leg pulls on the stem to open the valve. Preferably, the actuator is rotatable about the axis of the barrel for special dispensing conditions and packaging. To effect better capture between the rear cap and the actuator the two are preferably rotatably coupled together.

The interior of the base is generally hollow but has a longitudinally extending stem that defines a product passage which extends through the base into the product passage in the barrel. This stem provides for the mounting of a dip tube in the dispenser and a place for a chock to modulate the velocity of product discharge.

The features outlined in general above, and other features, aspects and advantages of the present invention will become more apparent from the following description, appended claims and drawings.

BRIEF DESCRIPTION OF THE FIGURES

FIG. 1 is an elevational view, partly in half section, of the improved dispensing valve of the present invention as it would appear mounted on a typical dispenser, shown in phantom;

FIG. 2 is an elevational view, partly in half section, of the housing of the dispensing valve of the present invention illustrating the valve's rear cap mounting flange and the exterior geometry of the valve;

FIG. 4 is a view taken along lines 4—4 of FIG. 2;

FIG. 5 is a top view of the dispensing valve of the present invention;

FIG. 6 is a partial rear elevational view of the dispensing valve; and

DESCRIPTION OF THE PREFERRED EMBODIMENTS

Figure 3:
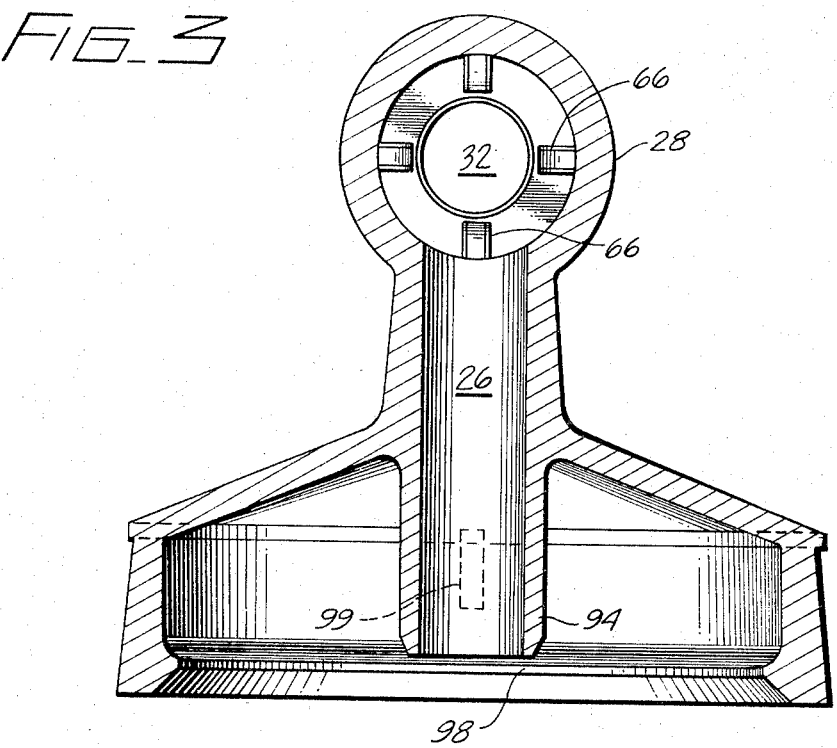
FIG. 3 is a view taken along lines 3—3 of FIG. 2.

FIG. 1 illustrates an improved dispensing valve 10. In general the valve includes a housing 12 and a valving mechanism 14. The housing includes a base 16 constituted of an annular bottom mounting and retaining section 18 which is adapted to be mounted on a dispenser 20, a skirt 22 tapering up from the retaining section, and a pedestal 24. A product passage 26 extends through the pedestal for communication with product within the dispenser. The housing also has a barrel 28 which has a longitudinal axis that extends at a right angle to the longitudinal axis of the base and the product passage. The barrel defines a longitudinal bore 30 which is tapered throughout its length, save for a right cylindrical section 31, from a nozzle 32 to the rear of the barrel with the taper diverging towards the rear.

The valving mechanism includes a plug 34 which is disposed within bore 30 of barrel 28 for movement along the barrel's longitudinal axis between an open and a closed position. In the closed position the plug seats against an annular sharp-edged seat 36 at the mouth of the bore of the barrel and longitudinally slightly inward of the mouth of nozzle 32. The plug section includes a cup seal and pressure responsive element 38 which has a flexible annular lip 40 engaged with the wall of right cylindrical section 31 of bore 30. The rear end of the barrel is closed by a rear closure cap 42. A spring 44 bearing against the rear cap and the plug provides a closing force on the plug which normally forces it against seat 36. A valve stem 46 carries the plug and extends through the rear cap to a head 48. An actuator 50 is received on the valve stem for pivoting on rear closure cap 42 to force the plug and valve stem against spring pressure to an open position.

With this generalized description in mind, a brief description of the valve's operation will be given for background of the more detailed description which follows.

Dispenser 20 maintains a product under pressure. Product pressure is felt in a product chamber 52 of the barrel, which is that portion of bore 30 between cup seal 38 and seat 36 which surrounds plug 34. This product pressure urges against cup seal 38 and tends to open the valve. The counteracting force of spring 44, however, under normal operation pressures, maintains the plug firmly against seat 36. When a consumer seeks to operate the valve he merely presses down on actuator 50 which causes it to pivot about a point on rear closure cap 42 to force the valve stem and its carried plug to its open position against the force of spring 44. Product under the influence of dispenser pressure will leave nozzle 32. It should be noted that the point of product egress is very close to seat 36. In the event that the dispenser's internal pressure becomes too much, the pressure will act on cup seal 38 to overcome the closing force of spring 44 and vent the valve.

Proceeding with the detailed description of the valve, the valve mechanism will be described in detail. Stem 46 is generally cylindrical and has a pair of longitudinally spaced apart, annular locking rings 54. Each locking ring has a leading tapered section to pilot the stem in its entry into a bore 56 of plug 34 from the rear end of the plug. That is, each of the tapers converges toward the front tip of the valve stem. In addition, the leading end or tip of the stem is tapered to aid in the stem's entry into the plug's bore. A shoulder at the rear of each of the locking rings provides against back-out of the valve stem from its installed position in the plug. Complementary recesses formed in the bore of the plug receive the locking flanges. It has been found necessary to provide two locking flanges because plug 34 is formed of a relatively soft material, such as low density polyethylene, and, as such, the plug material displaces readily. In other words, with only one flange it is hard to keep the plug and stem together. The stem and the bore of the plug should allow air to escape from the bore during the installation of the stem in the bore. This may be done, for example, by providing a longitudinal groove in the stem from its tip past the rear locking ring. The stem is made of a relatively strong and stiff material such as polypropylene because it must withstand bending stresses created during actuation, and head 48 must be strong enough to resist the force of actuation.

Cup seal 38 has a flexible lip 40 which extends longitudinally into product chamber 52 and flares slightly outwardly for compressive engagement With the right cylindrical wall portion of bore 30. As such, the lip defines an annular recess between it and the body of plug 34. The lip is sufficiently flexible to allow product pressure acting against it to force the lip to seal against the cylindrical wall of the bore of the barrel. A base 58 of the cup seal extends longitudinally to the rear of the lip with a right cylindrical exterior surface to provide purchase for spring 44 and to connect the lip with the balance of the plug. There is a slight clearance between the exterior surface of the base and the tapered bore of the barrel to accomodate the sealing function of lip 40. But this clearance is limited to allow the base to contact the wall of the barrel's bore during actuation to prevent the loss of the seal and possible permanent canting of the plug. The rear surface of base 58 is dished to provide a guide for spring 44, and to accommodate the spring's required longitudinal length while providing sufficient bearing area for the base when it contacts the wall of the barrel's bore.

It is well known in molding practice that a taper in a bore facilitates core withdrawal. Typically for core withdrawal alone a taper of ½° is sufficient. The taper of bore 30, however, exceeds this taper and is preferably of the magnitude of one and one-half degrees in order to facilitate assembly, the procedure for which will be described subsequently.

As previously mentioned, plug 34 seats on an annular sharp edge at the entrance to nozzle 32 to effect a line seal. The end of the plug is chamfered to effect a frusto-conical seating portion 68. Thus slight angular variations between the axis of the plug and the valve seat will not affect the seal.

As previously described, valve stem 46 extends through the rear of barrel 28 to a terminus at head 48. A slight clearance is provided between the shank of the stem and the hole 60 in rear cap 42 through which the stem extends. This clearance is to allow the valve stem to move slightly upward with respect to its position of repose when the valve is actuated. The clearance also provides for the passage of locking rings 54 through hole 60 during assembly of stem and the plug. To allow actuator 50 to move angularly with respect to the valve stem during actuation and impart an opening force on the head which acts along the stem's axis, a hole 62 in the actuator, through which the shank of the stem passes, also provides a clearance between the actuator and the shank of the stem. The head of the stem defines a shoulder 64 against which actuator 50 bears during the actuation of the valve. There may be a slight clearance between the shoulder of the head and the actuator.

With specific reference to the construction of barrel 28 which is shown best in FIGS. 2 and 3, a plurality of circumferentially disposed guides 66 are disposed in the wall of bore 30 of the barrel to guide the plug to seat 36. These guides, preferably four in number at regularly spaced intervals, have a flank taper converging towards the rear of the barrel and an edge taper also converging towards the rear of the barrel. The edge is rounded intermediate the ends of the guide for installation of the plug. The taper of the guides is to facilitate the pulling of the core pin.

Nozzle 32 opens into bore 30 at seat 36. The nozzle may be formed in any of a number of shapes to obtain special effects in dispensed product. For example, the nozzle may be star-shaped. If desired, the plug section can continue into the nozzle portion to completely block off any recesses in which product could otherwise stay. In the star configuration, for example, the head of the plug can be star-shaped to mate with and be received in the star-shaped nozzle. In such a configuration it is still preferred to have the line seal between frusto-conical portion 68 and seat 36.

An external locking flange 70 is formed at the rear end of barrel 28. This locking flange circumscribes only a portion of the circumference of the barrel. This is shown clearly in FIG. 2 at terminus 71. The flange provides for the mounting of rear cap 42. Flange 70 has a taper which converges towards the rear of the barrel. It terminates at a right-angled shoulder.

The rear cap has an annular recess which is complementary shaped with respect to flange 70 for receiving the flange. This recess is defined by a tapered annular internal wall 72 emanating from the base of the cap and extending up to radially inwardly directed, annular flange 74. As is seen clearly in FIG. 1, flange 74 overlies locking flange 70 at the latter's shoulder to secure the cap in place. The base of the cap includes hole 60 through which stem 46 passes. It also includes a dished recess 76 which has a flanking frusto-conical annular wall 78 that serves to maintain the proper orientation of compression spring 44 by preventing it from moving off Its axis. The material of the base of the cap radially from this wall also acts as an internal reinforcing rib for the cap to aid in withstanding the somewhat substantial force of the compression spring. In addition, this material bears against the wall of tapered bore 30 to aid in maintaining axial alignment of the cap.

As is seen in FIG. 6, cap 42 has a pair of upright ribs 80 on the outside of the cap which define a channel for the receipt of actuator 50 and bearing lugs to rotatably couple the actuator and rear cap together.

Actuator 50 is generally L-shaped in elevational cross section. The long leg of the actuator normally extends longitudinally and slightly upwardly over barrel 28. The short leg of the actuator extends generally parallel to the back face of closure cap 42. The junction of the two legs of the actuator defines a radiused corner which bears against the external corner of the closure cap to provide a pivot 81. As is seen to best effect in FIGS. 5 and 6, the long leg of the actuator includes a dished finger recess 82. To indicate the direction of product discharge, an arrow 84 is formed in the surface of this recess. A rib 86 extends around the exposed periphery of the actuator to help define the finger recess and to provide reinforcing for the actuator. As is especially apparent in FIG. 1, the rib is fairly deep at the junction of the two legs of the actuator where bending loads are high. On the short leg, rib 86 tapers off to merge into the balance of the actuator. Where actuator 50 engages closure cap 42 at pivot 81, one or more of the contacting surfaces can be knurled to provide good bearing. As previously mentioned, ribs 80 formed in the rear of cap 42 bear against the sides of the short leg of actuator 50 to couple the actuator and cap together for common rotation about the longitudinal axis of the barrel.

With reference again to FIGS. 1 and 2, the housing of valve will be described in greater detail with particular reference to its exterior geometry, which, as previously mentioned, results in a very inexpensive valve owing to molding ease and the maximization of the number of mold cavities in any given mold base. In FIG. 2, a parting line 90 is shown. This line represents a parting surface or planes of a mold (shown in FIG. 7). Base 16 of the valve housing up to pedestal 24 is described by a surface of revolution generated by a line rotated about the longitudinal axis of the base. This axis lies on that portion of the base parting plane passing through the base. The mold separates from right to left in FIG. 2. That is, it separates normal to the parting plane through the base. It will be observed that there are no undercuts in the external surface of the base on either side of the parting plane which would prevent the effective removal of the molded valve housing from the mold.

The barrel's parting plane meets the shoulder defined by external flange 70 and the balance of the barrel and extends to terminus 71 of the mounting flange. A transition parting plane, disposed at a slight angle to a normal between the parting planes of the barrel and the base, connect the other two parting planes. The transition parting plane is at an angle of, say, 5° for purposes which will become apparent in the description of the mold. Again, there are no undercuts on the external surface of the barrel or the flange which would prevent the removal of the valve housing from the mold.

The external surface of the barrel between the barrel's parting plane and the base's parting plane is right cylindrical to avoid undercuts in either mold half. The balance of the barrel tapers longitudinally towards the nozzle end to facilitate part removal.

As is illustrated in FIG. 4, pedestal 24 has lateral sides 92 which may taper slightly towards the barrel, but which are otherwise parallel to each other. Thus there are no undercuts in the direction of mold pull in the pedestal. The external surface of the pedestal could be a surface of revolution so long as the axis of revolution lies in the base's parting plane and is coaxial with the axis of revolution of the balance of the base, but if the external surface of the pedestal were a surface of revolution, the size of passage 26 could become smaller than desired.

Passage 26 which leads into product passage 52 of barrel 28 is disposed off the longitudinal axis of the base and is defined by a tube 94 which is externally tapered for a mold release and is also internally tapered for the same purpose. A choke 96 is disposed in this passage to reduce the velocity of product emanating from nozzle 32. For many products this choke is not necessary and FIG. 3 shows passage 26 free of a choke. The bottom of the base has an internal, annular, radial flange 98 adapted to be snapped over the lip of the dome of a dispenser. A lock ring fits over the bottom of the base after it has been snapped over the lip to anchor the valve housing in place. The internal flange at the bottom of the base, considered with the rest of the base material, allows for the base to expand to release the part from the core used in the forming of the base.

To seat the housing properly and prevent movement of the housing with respect to the lip of the dispenser's dome, regularly spaced lugs 99 are provided on an inner wall of the base to engage the top of the lip.

As is especially evident from FIGS. 1 and 4, the interior of base 16 is largely hollow. In addition, the wall thickness of the base and the balance of the housing are maintained fairly uniform. The primary reasons for this are to avoid heat sinks and keep mold cycle time as low as possible by avoiding small surface-to-volume ratios in the housing.

Figure 7:
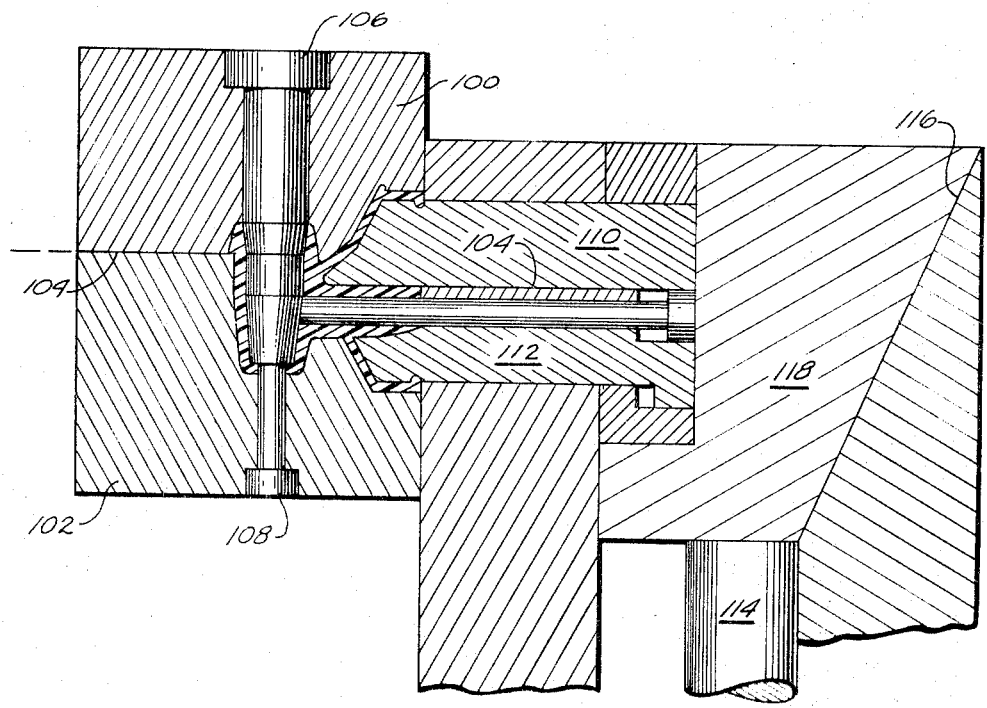
FIG. 7 is a partial view of a mold suitable in fabricating the housing of the dispensing valve illustrated in the previous Figures.

With reference to FIG. 7, a typical mold will be described. The mold has an upper mold half and a lower mold half, 100 and 102, respectively. A parting line 104 separates these two mold halves. The parting line follows parting surface 90 and as such is staggered, has a barrel portion, a transition portion, and a base portion. A core pin 106 is anchored in the upper portion of the mold and extends into a recess in the bottom portion of the mold to define bore 30 of barrel 28. A complementary coaxial core pin 108 is anchored in the lower mold half and telescopes into a bore in core pin 108 to define a nozzle 32. A core 110 is disposed to define the interior of base 16. A core pin 112 defines passage 26. An ejection shaft 114, together with others not illustrated, provides for the separation of the mold halves.

Core 110 must rise with upper mold half 100 to allow its withdrawal from the interior of base 16. This is effected by a ramp 116 and a float 118. The ramp and float are coupled together as by a pintle and mortise slide. As the ejection pins rise, the upper half of the mold will lift straight up and carry with it core 110 and pin 112. In other words, clearances between float 118, and core 110 and core pin 112 allow the upper mold half to move straight up while float 118 moves up ramp 116. However, the clearances ultimately disappear and core 110 and core pin 112 are withdrawn from the housing by virtue of the horizontal component of motion of the float resulting from the float's ascending the ramp. Actually, core 110 is withdrawn from the housing first, followed by core pin 112.

As previously mentioned, parting surface 104 corresponds to parting surface 90 of the valve housing. In the barrel of the housing illustrated in FIG. 7, parting surface 104 shifts from one elevation to another through a transition section. This section is disposed at an angle of about 5° from the vertical between the two parallel sections of the parting surface. This angle produces very accurate registration of the mold halves. The angle also provides terminus 71 for locking flange 70 sufficiently above the bottom oF the barrel to avoid feather edges in the mold which would not be able to withstand injection pressures.

The assembly of valve 10 will now be described. Initially, plug 34 is placed in bore 30 through the opening in the barrel. The relatively large taper of the bore admits to the easy insertion of the plug because lip 40 will not engage the wall of the bore at the rear of the bore as much as it does when approaching seat 36.

Spring 44 and rear closure cap 42 are then installed in that order. Actuator 50 is then positioned properly with respect to cap 42. Finally, stem 46 is inserted through the holes in the rear cap and actuator, and locked in place by locking rings 54 snapping into place in the complementary recesses of the plug.

What is claimed is:
1. An improved dispensing valve comprising:
 a. a valve housing having:
  i. a base adapted to be securely affixed to a dispenser of the type which maintains a product to be dispensed under pressure;
  ii. a barrel on the base having a longitudinal bore normal to the longitudinal axis of the base and open to atmosphere, and means for communicating the interior of the dispenser with the bore; and
  iii. an external mounting flange extending partially around the rear end of the barrel to terminate at least at the junction of the base and the barrel, the external mounting flange defining a shoulder which faces the front of the barrel;
 b. valving means disposed in the bore of the barrel for selectively opening and closing the valve; and
 c. a closure cap having an internal flange, the closure cap being secured to the barrel over the external mounting flange to keep the valving means within the bore with the internal flange being longitudinally of the barrel adjacent the shoulder of the external flange.

2. The improved dispensing valve claimed in claim 1 wherein:
the valving means includes a selectively displaceable plug normally closing the bore to atmosphere, the bore has at least one tapered portion, with the taper diverging towards the rear end of the barrel, and including a cup seal on the plug in sealing engagement with the wall of the bore and sealing the bore to the rear of the cup seal from the interior of the dispenser.

3. The improved dispensing valve claimed in claim 2 wherein:
the plug in its closed position seats on an interior seat proximate the opening of the bore to atmosphere.

4. The improved dispensing valve claimed in claim 3 wherein:
the plug is biased to its closed position by a spring disposed between the plug and the closure cap, the spring being operable upon the presence of a predetermined excessive pressure in the bore acting on the cup seal to yield and allow the plug to open.

5. The improved dispensing valve claimed in claim 4 wherein the valving means includes a valve stem carrying the plug and extending through the closure cap, and an actuator coupled to the valve stem and barrel for pivotal movement about a pivot point on the closure cap to translate the plug between its open and closed positions.

6. The improved dispensing valve claimed in claim 5 wherein:
the valve stem has at least one locking ring with a frusto-conical leading surface, the plug has a bore with a recess for each of the locking rings, and the valve stem is secured to the plug by the receipt of each of the locking rings in its complementary recess.

7. The improved dispensing valve claimed in claim 5 wherein the seat and the plug define a line seal in the plug's closed position.

8. The improved dispensing valve claimed in claim 1 wherein:
the barrel opens to atmosphere at a nozzle and the valving means includes a plug normally in sealing relationship with a seat defined by the nozzle's entrance into the bore, a cup seal on the plug including a lip in compressive engagement with the wall of the bore, a compression spring urging against the plug to maintain the plug in its sealing relationship with the seat at pressures below a predetermined maximum, a valve stem carrying the plug and extending through the rear end of the closure cap, and an actuator engaged with the valve stem and the closure cap for pivotal movement to open the plug by forcing it against the force of the spring.

9. An improved dispensing valve for a pressurized dispenser of the type which maintains a product to be dispensed under pressure comprising:

a. an integrally molded one-piece housing having a base adapted to be rigidly secured to the dispenser, a barrel having a bore disposed at a right angle to the longitudinal axis of the base, the bore being tapered throughout its length from a rear end of the barrel to a nozzle end thereof except in an intermediate section thereof which is right cylindrical with the taper converging towards the nozzle end, an external flange at the rear end of the barrel extending partly around the barrel but terminating at a point no lower than the uppermost point of the base, the housing presenting no undercuts on either half of a parting surface extending through the base, containing the base's longitudinal axis and being normal to the axis of the bore, a parting surface extending through the barrel normal to the bore at the juncture of the external flange with the balance of the barrel, and a transition surface between the first two mentioned surfaces; and b. a valving mechanism including a plug disposed in the bore for longitudinal movement therein between a closed position on an interior seat at the nozzle end of the bore and an open position away from the seat toward the rear end of the bore, a cup seal at the interior end of the plug disposed in sealing engagement with the wall of the right cylindrical section of the bore and defining a product chamber between it and the nozzle end, the product chamber opening into the base for product communication with the interior of the dispenser, a closure cap closing the rear end of the bore and being secured to the barrel by the external mounting flange, a valve stem attached to the plug and extending through the closure cap, an actuator engaged with the valve stem for selectively opening the plug, and a compression spring acting on the plug to maintain it in a closed position, the spring constant of the compression spring being such that at a predetermined excessive pressure in the product chamber acting on the cup seal the force of the spring is overcome and the plug opens.

10. The improved dispensing valve claimed in claim 9 wherein a plurality of plug guides are disposed in the bore proximate the nozzle end thereof, the plug guides being tapered along their flanks and tops with the tapers on the tops of the plug guides diverging toward the rear end of the barrel.

11. The improved dispensing valve claimed in claim 9 wherein the base has a stem defining a product passage for communicating the interior of the dispenser with the product chamber, the stem being disposed off the longitudinal axis of the base and being adapted to receive a choke and mount a product dip tube.

12. The improved dispensing valve claimed in claim 9 wherein the actuator pivotally engages the rear closure cap for pivotal movement in the opening and closing of the valve, the actuator and the rear closure cap being coupled together for selective rotation about the axis of the bore.

13. The improved dispensing valve claimed in claim 12 wherein the actuator has an external peripheral rib extending substantially completely about the exposed surface thereof to define a finger recess and to increase the strength of the actuator against bending stresses.

14. The improved dispensing valve claimed in claim 12 wherein the coupling of the rear cap and the actuator is effected through a pair of ribs on the closure cap which define a recess that receives the actuator, the ribs providing rotation bearing for the actuator.

15. The improved dispensing valve claimed in claim 9 wherein the external surface of the barrel to the rear of a plane normal to the barrel's longitudinal axis and containing the base's longitudinal axis to the external mounting flange is right cylindrical, and from this plane forward to the nozzle end is tapered with the taper converging towards the nozzle end.

16. The improved dispensing valve claimed in claim 15 wherein the base includes a pedestal and a mounting portion, the mounting portion being adapted for securing the housing to the dispenser, the pedestal being between the mounting portion and the barrel, the external surface of the mounting portion being defined by a surface of revolution generated by a line rotated about the longitudinal axis of the base, the pedestal having an external surface which defines a pair of parallel straight sides connected by two curved ends where cut by a plane normal to the longitudinal axis of the base and extending through the base's longitudinal axis.

17. An improved dispensing valve for a pressurized dispenser of the type which maintains a product to be dispensed under pressure comprising:

a. a valve housing having:
 i. a base adapted to be securely affixed to a dispenser body,
 ii. a barrel having a bore disposed at a right angle to the longitudinal axis of the base, a nozzle end and a rear end,
 iii. a nozzle opening into the bore at the nozzle end,
 iv. the bore opening at the rear end of the barrel,
 v. an external mounting flange at the rear end of the barrel extending around the barrel and extending no further than the elevation of the base where the latter meets the barrel,
 vi. the housing being integrally formed of plastic and having an exterior surface which presents no undercuts on either side of:
  1. a parting plane extending through the barrel at the inner terminus of the mounting flange,
  2. a parting plane extending through the base parallel to the barrel's parting plane but spaced therefrom and being normal to the axis of the bore, and
  3. a transition parting plane connecting the barrel and base parting planes and being disposed at an angle slightly greater than 90° from each of these parting planes; and b. valving means having:
 i. a plug normally disposed in sealing relationship against an annular seat at the nozzle end of the barrel,
 ii. an annular seal at the rear end of the plug engaging the wall of the bore in sealing relationship therewith,
 iii. a valve stem carrying the plug and extending through the rear end of the barrel,
 iv. a rear closure cap secured on the mounting flange and closing the rear end of the barrel,
 v. the stem extending through the rear closure cap,
 vi. a compression spring between the rear closure cap and the plug to maintain the plug in sealing relationship against its seat, the spring constant being such that upon the occurrence of a predetermined excessive pressure in the dispenser the closing force of the spring is overcome and the valve opens to vent the dispenser, and vii. an actuator engaging the valve stem and being pivotally supported by the closure cap for pivotal action to open and close the valve.

18. An improved dispensing valve comprising:
a. a valve housing having:
   i. a base adapted to be securely affixed to a dispenser of the type which maintains a product to be dispensed under pressure;
   ii. a barrel on the base having a longitudinal bore normal to the longitudinal axis of the base and opening to atmosphere at a nozzle disposed at one end of the bore; and
   iii. means through the base for communicating the interior of the dispenser with the bore;
b. a closure cap secured to the barrel at the end thereof opposite the nozzle;
c. valving means for selectively opening and closing the valve having:
   i. a plug in the bore normally in sealing relationship with the barrel at the nozzle end thereof to close the nozzle;
   ii. a cup seal integrally formed on the plug having an annular lip in sealing engagement with the wall of the bore, the concave side of the cup seal facing the nozzle;
   iii. a valve stem separately formed from the plug, the valve stem being attached to the plug and extending through the closure cap; and
   iv. spring means acting between the closure cap and the cup seal to maintain the plug in its sealing relationship with the barrel; and
d. actuator means for selectively translating the plug in the bore to discharge product from the dispenser, the actuator means being pivotally secured to the valve stem at the end thereof which extends through the closure cap, bearing on the closure cap such that the closure cap provides a fulcrum therefor, and having a portion extending beyond the fulcrum to provide an arm for the application of a force to cause the actuator means to pivot on the fulcrum and translate the plug.

19. The improved dispensing valve claimed in claim 18 wherein:
plug guide means is provided, the guide means being integrally formed with the barrel and extending into the bore to guide and center the plug means concentrically of the axis of the barrel, to maintain such concentricity against the forces of actuation, and to define a product flow path in the bore and outside the plug.

20. The improved dispensing valve claimed in claim 19 wherein the closure cap has a pair of spaced-apart ribs which define a recess, the actuator being received in the recess at least between the fulcrum and its pivotal connection to the valve stem.

21. The improved dispensing valve claimed in claim 20 wherein the valve stem has at least one locking ring, the plug has a bore with a recess for each of the locking rings, and the valve stem is attached to the plug by receipt of each of the locking rings in its complementary recess.

22. The improved dispensing valve claimed in claim 21 wherein the bore is tapered throughout its length except radially of the seal means where it is right cylindrical, the annular lip of the cup seal being in compressive engagement with the wall of the right cylindrical section of the bore, the taper of the bore diverging away from the nozzle.

23. The improved dispensing valve claimed in claim 19 wherein:
a. the barrel has an external mounting flange extending partially around the end of the barrel opposite the nozzle to terminate in elevation no further than the junction between the base and the barrel, the external mounting flange defining a shoulder which faces the nozzle end of the barrel; and
b. the closure cap has an internal flange, the closure cap being secured to the barrel over the external mounting flange with the internal flange overlying and being adjacent the shoulder of the external flange.

24. The improved dispensing valve claimed in claim 23 wherein:
the closure cap has an internal annular flange bearing against the wall of the bore, the flange defining a frusto-conical face on its radial interior to pilot the spring means into concentric orientation with the valve stem.

* * * * *